Oct. 31, 1939.　　　L. F. SOMMERFELD　　　2,177,911
ENSILAGE HARVESTING MACHINE
Filed May 19, 1938　　　5 Sheets-Sheet 3

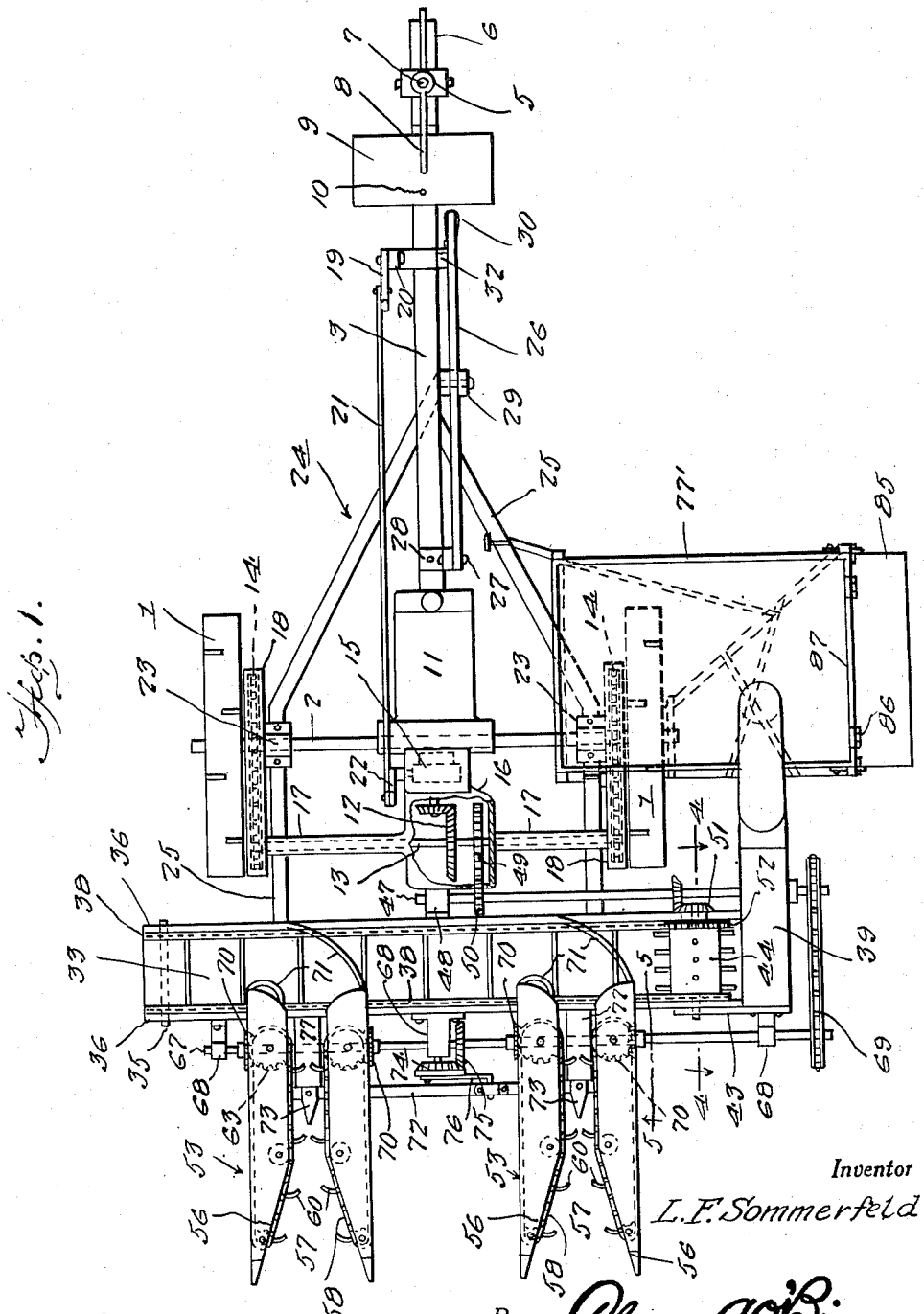

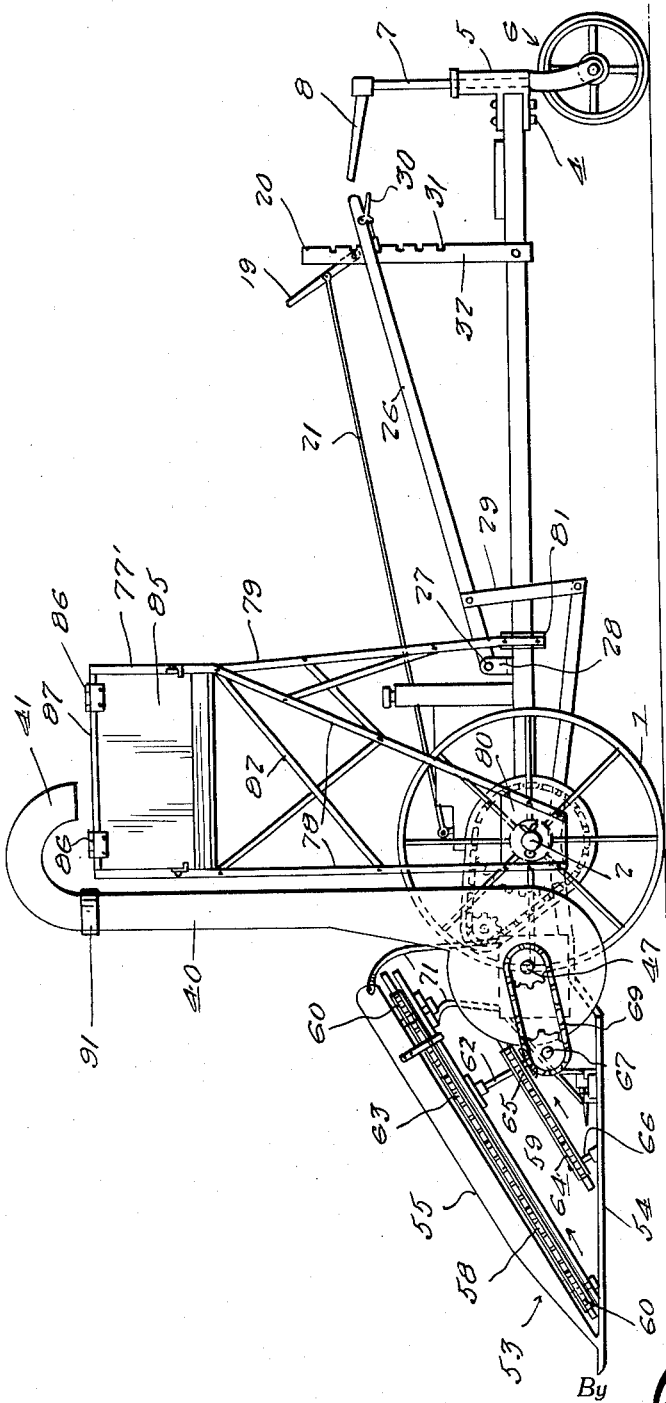

*Inventor*
L. F. Sommerfeld

By Clarence A. O'Brien
and Hyman Berman
*Attorneys*

Oct. 31, 1939.    L. F. SOMMERFELD    2,177,911
ENSILAGE HARVESTING MACHINE
Filed May 19, 1938    5 Sheets-Sheet 4

Inventor
L. F. Sommerfeld

By Clarence A. O'Brien
and Hyman Berman
Attorneys

Oct. 31, 1939.  L. F. SOMMERFELD  2,177,911
ENSILAGE HARVESTING MACHINE
Filed May 19, 1938   5 Sheets-Sheet 5

Inventor
L. F. Sommerfeld
By Clarence A. O'Brien
and Hyman Berman
Attorneys

Patented Oct. 31, 1939

2,177,911

UNITED STATES PATENT OFFICE 2,177,911

ENSILAGE HARVESTING MACHINE

Leonhart Fredrick Sommerfeld, Canton, Kans., assignor of one-third to Harry G. Rolf, McPherson, Kans.

Application May 19, 1938, Serial No. 208,907

2 Claims. (Cl. 56—16)

My invention relates to improvements in harvesting and cutting machines for cutting cornstalks into ensilage for use in silos.

The principal object of the invention is to provide an efficient, high speed, motor operated machine of the tractor type equipped for cutting cornstalks in the fields, two rows at a time, and for converting the stalks into ensilage, storing the ensilage, and delivering the same into a truck, or the like, driven alongside the machine.

Other and subordinate objects, together with the exact nature of my improvements, will be readily understood when the succeeding description and claims are read with reference to the accompanying drawings.

Figure 4:
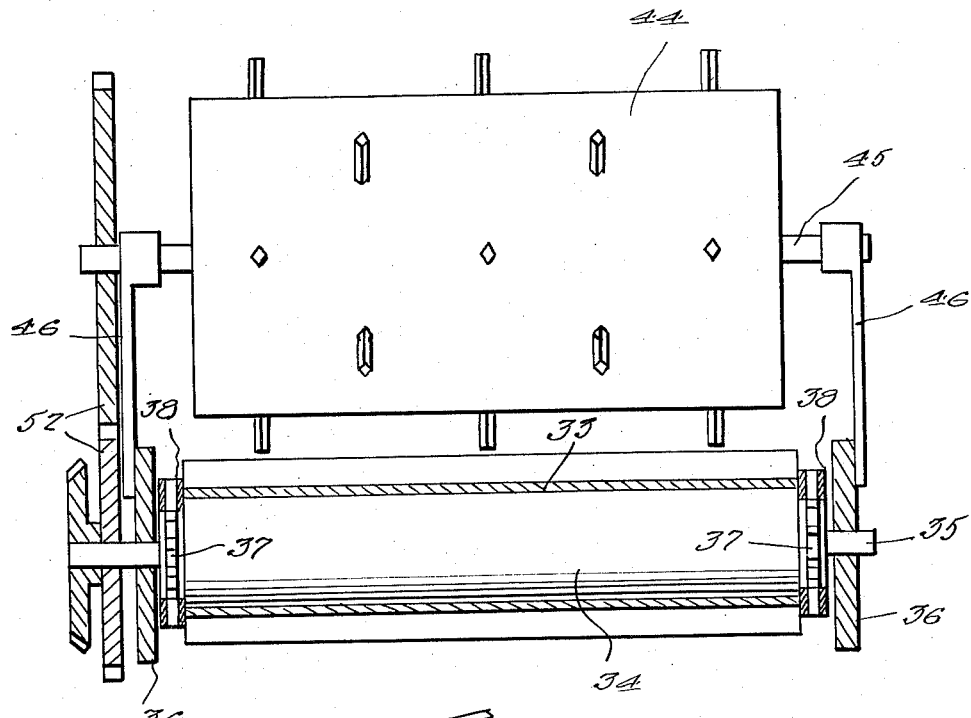
Figure 7:
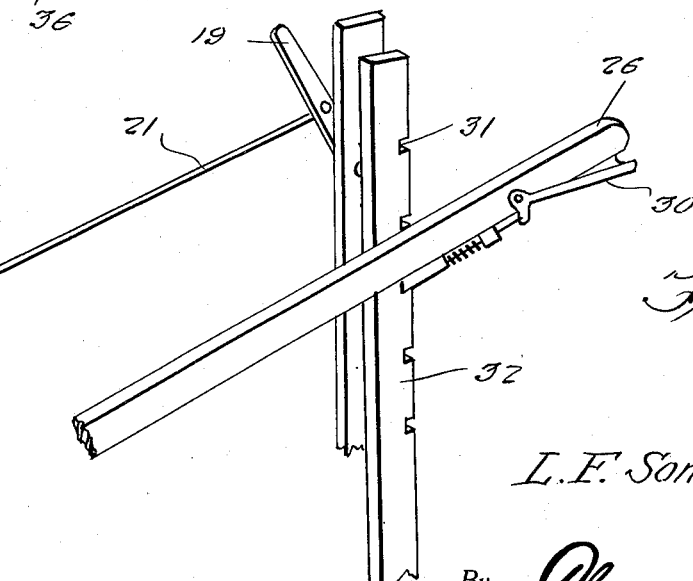
Figure 5:
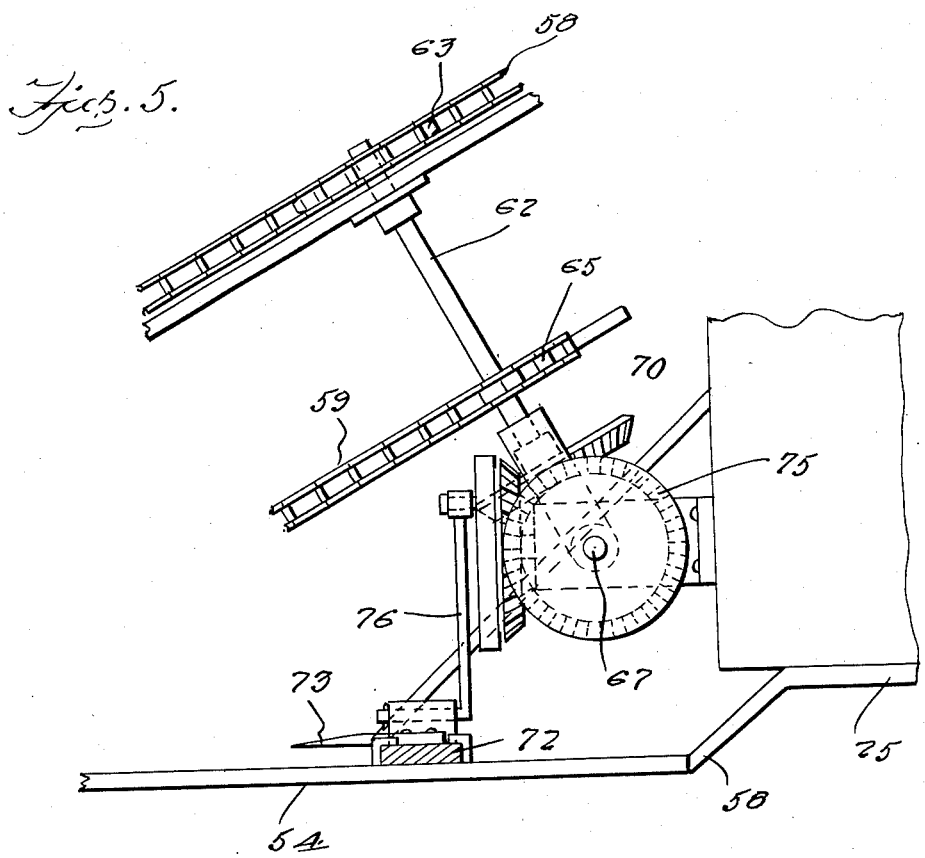
Figure 6:
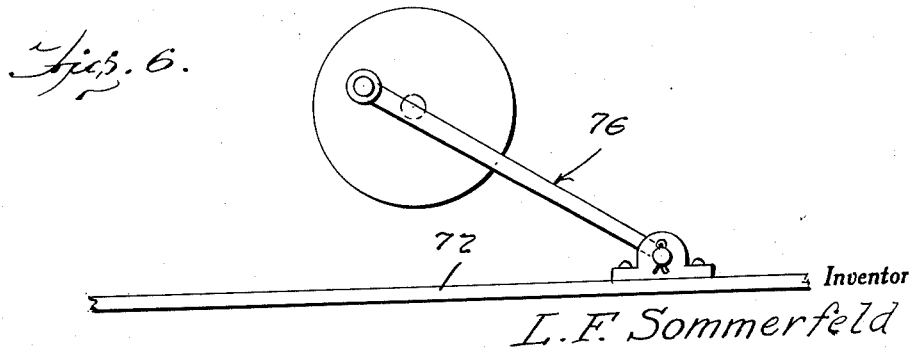

In said drawings:

Figure 1 is a view in top plan of a harvesting and cutting machine constructed in accordance with my invention, Figure 2 is a view in side elevation, looking at the left hand side of the machine, Figure 3 is a detail view in front elevation drawn to an enlarged scale, with parts shown in section and parts eliminated for the sake of clearness of illustration, Figure 4 is a detail view in transverse section drawn to an enlarged scale and taken on the line 4—4 of Figure 1, looking in the direction indicated by the arrows, Figure 5 is a similar view taken on the line 5—5 of Figure 1, looking in the direction of the arrows, Figure 6 is a fragmentary view in side elevation of the pitman drive for the cutter bar, Figure 7 is a fragmentary view in perspective of the adjusting lever and detent therefor, together with the clutch control lever, and Figure 8 is a fragmentary view in front elevation of the storage bin and supporting structure therefor.

Referring to the drawings, by numerals, the machine of my invention includes a pair of leading ground wheels 1 fast on an axle 2 to which is suitably secured, centrally thereof, the front end of a trailing beam 3, having bolted, as at 4, to the rear end thereof, a vertical sleeve bearing 5 in which is rotatably mounted a caster type steering wheel assembly 6 including a vertical shaft 7 journaled in said bearing 5 and having a hand steering lever 8 affixed to the upper end thereof. In front of the bearing 5 and adjacent thereto, an operator's platform 9 is secured on the beam 3, as at 10.

Suitably secured on the front end of the beam 3 is a motor 11 in the form of an internal combustion engine operatively connected by means of beveled gearing 12 to a jack shaft 13 extending across the machine in front of said motor and which in turn is operatively connected to the axle 2, adjacent the inner sides of the ground wheels 1, by means of a pair of sprocket and chain drives 14 between opposite ends of said jack shaft 13 and said axle 2, respectively. A clutch 15 is interposed in the line of connection between the motor 11 and gearing 12. The construction of the motor 11 and clutch 15 being immaterial to the invention, these parts have merely been illustrated conventionally. The clutch 15 and gearing 12 are enclosed in a casing 16 extending forwardly from the motor 11 well above the axle 2 and having laterally extending tubular housings 17 in which opposite ends of the jack shaft 13 are journaled and which support said shaft and parts carried thereby. The sprocket and chain drives 14 are enclosed by housings 18 extending between the outer ends of said housings 17 and through which the axle 2 extends. The clutch 15 is shifted by means of a clutch control hand lever 19 pivoted on an upright 20 arising from and suitably secured to the beam 3 in front of the platform 9, said lever being operatively connected by a rod 21 to a clutch shifting lever 22.

Mounted on the axle 2, by bearings 23, for vertical rocking movement intermediate the housings 18, is an underslung frame 24 preferably of angle bar construction and including side bars 25 converging and connected together in the rear of said axle and extending straight forward equidistantly in parallel relation in front of said axle. The frame 24 is adapted to be rocked vertically into different set positions, for a purpose presently seen, by means of a hand lever 26 pivotally mounted, as at 27, on a bracket 28 suitably secured to the beam 3, said lever extending rearwardly over the platform 9 and being operatively connected by a link 29 to the rear end of the frame 24, and having the usual detent 30 on the rear end thereof adapted to be engaged electively, with notches 31 in a detent bar 32 arising from the beam 3 alongside the upright 20.

Extending across the front ends of the side bars 25, in front of the wheels 1 and housing 16 is a cross conveyor 33 extending beyond said side bars and trained around rollers 34 fast on shafts 35 journaled in side bars 36 forming the frame of the conveyor and secured in any suitable manner on said side bars 25. The shafts 35 are operatively connected together adjacent each end of the rollers 34 by means of sprockets 37 fast on said shafts and sprocket chains 38 connecting the sprockets 37 on one shaft to those on the other. The conveyor 33 is adapted to be driven, in a manner presently described, in a direction to convey cornstalks fed thereon toward the left hand side of the machine.

At the left hand end of the conveyor 33 is a substantially cylindrical combined cutter and blower casing 39 open at one side onto the conveyor and having arising therefrom a vertically disposed discharge pipe 40 terminating at its upper end in a rearwardly and downwardly curved discharge end 41. Within the casing 39 is a suitable rotary combined cutter and blower represented at 42, designed to cut cornstalks into short lengths and to subsequently blow the same up the discharge pipe 40. The casing 39 and parts carried thereby are secured to the bars 36 of the conveyor frame by means of bracket arms, one of which is shown at 43. Adjacent to said casing 39 is a toothed feeding drum 44 fast on a shaft 45 extending across the conveyor and journaled at its opposite ends in bearing arms 46 arising from and secured to the bars 36. The feeding drum 44 is designed to be driven in a direction to throw the stalks on the conveyor 33 into the casing 39 and to the combined cutter and blower 42.

The conveyor 33, feeding drum 44, and the combined cutter and blower 42 are driven by the following means. In the rear of the rear bar 36 of the conveyor frame is a transverse shaft 47 journaled at one end in a bearing 48 extending from the housing 16 and having its other end extended through the casing 39 with the combined cutter and blower 42 fast thereon within said casing 39. The shaft 47 is driven by means of a gear 49 fast on the jack shaft 13 and meshing with a smaller gear 50 fast on said shaft 47. Double gearing 51 between said shaft 47 and the left hand conveyor shaft 35 operatively connects the former to the latter whereby the conveyor 33 is positively driven, as will be clear. The left hand conveyor shaft 35 is operatively connected to the shaft 45 of the toothed feeding drum 44 by means of gearing 52. Thus, as will be seen, the conveyor 35, toothed feeding drum 44 and the combined cutter and blower are simultaneously driven.

In front of the conveyor 35 are two pairs of gathering units 53 spaced apart upon opposite sides of the longitudinal center of the machine in accordance with the spacing between rows of corn and adapted as hereinafter described to feed cornstalks onto the conveyor 33.

Each gathering unit 53 includes a pair of laterally spaced frames extending forwardly of the conveyor 33 and comprising the lower horizontal bar 54 and an upper bar 55 inclining upwardly and rearwardly over the front edge of said conveyor, the frames of each pair at their front ends being beveled, as at 56, to form a restricted throat 57 therebetween. The described frames are supported by brackets, as at 58, extending from the side bars 25. Between the upper and lower bars 54 and 55 of each frame is a pair of upper and lower sprocket chains 58 and 59 provided with laterally extending fingers 60, said chains inclining upwardly and rearwardly and functioning to grip the butt ends of the cornstalks therebetween and to feed the same, butts foremost, onto the conveyor 33. The upper chains 58 are trained around end idler sprockets 61 rotatably mounted on the under sides of the upper bars 55. Suitably located idler sprockets 61' rotatably mounted on the under sides of the upper bars 55 guide the upper sprocket chains 58 to follow the contour of the restricted throats 57 of the gathering units 53. Intermediate the idler sprockets 60, in each instance, a rearwardly inclined shaft 62 depends from the upper bar 55, said shaft being rotatable and having a driving sprocket 63 on the upper end thereof for driving the upper sprocket chain 58. The lower sprocket chain 59, in each instance, is trained around a pair of front and rear sprockets 64 and 65, the former rotatably mounted on a stud 66 upstanding from the lower bar 54 and the latter fast on the lower end of the shaft 62. In each instance, a fixed guide bar 55' parallels the upper bar 55 beneath the sprocket chain 58.

The sprocket chains 58 and 59 are driven in the proper direction, indicated by the arrows in Figure 2, as follows. Immediately in front of the front conveyor side bar 36 is a cross shaft 67 journaled in suitable bearing brackets 68 extending from said bar and from the casing 39. The cross shaft 67 is driven by the before mentioned shaft 47 through the medium of a sprocket and chain drive 69 connecting said shafts on the left hand side of said casing 39. The shaft 67 is operatively connected to each shaft 62 by means of beveled gearing 70, whereby the sprocket chains 58 and 59 are driven in the proper direction, previously indicated. A pair of curved guide rods 71 extend from the tops of the conveyor side bars 36 in the rear of the throats 57 and which are arranged so that when the stalks are fed onto the conveyor 33, the butt ends thereof will contact said guide rods and the stalks be laid out straight on the conveyor 33 under travel of the latter.

Suitably mounted on the lower bars 54 of the gathering units 53 is a reciprocating cutter bar 72 extending across said units in front of the shaft 67, and beveled gears 70, and having a pair of cutting blades 73 extending forwardly therefrom intermediate the frames of said units 53, respectively. The cutter bar 72 is operative to cut the cornstalks after they pass through the restricted throats 57 by means now to be described. A beveled gear 74 is rotatably mounted on one of the bearing brackets 63 and to which the shaft 67 is operatively connected by a beveled gear 75 fast on said shaft and meshing with gear 74. A pitman 76 operatively connects the gear 74 to the cutter bar 72 to reciprocate the same. Intermediate the described frames of each gathering unit 53 is a suitably fixed butter board 77 inclining upwardly and rearwardly from the cutter bar 72 to the top edge of the front conveyor frame bar 36 and functioning to elevate the butts of the stalks onto the conveyor 33 as they are gathered by the sprocket chains 58 and 59.

Immediately beneath the discharge end 41 of the discharge pipe 40 is an open top storage, or receiving, bin 77' having an open left side and mounted on outer and inner side legs 78, 79. The outer side legs 78 arise from a plate 80 mounted on the axle 2 for rotation of the latter therein. The inner side legs 79 are suitably secured, as at 81, to the frame 24. Diagonal struts 82 brace said legs 78 and 79. The bottom 83 of the bin 77' slopes downwardly toward the open side of said bin and extends beyond said side, as at 84, to provide for gravitational discharge of ensilage from the bin well beyond the same. A gate 85 hinged at its upper edge, as at 86, to a bar 87 extending across said bin, closes the open side of the latter. A pair of pivoted latch arms 88 extend from the front and rear sides of said bin 77' and are provided with notches 89 in their under edges for cooperation with studs 90 on the ends of the gate 85 to latch the latter in closed or open position as desired.

In the use of the described machine, the clutch 15 is engaged, in the manner already described, and the machine driven forwardly so that the gathering units 53 are centered relative to two rows of cornstalks which are gathered by means of the throats 57, the sprocket chains 58 and 59, and the fingers 60 in between the frames of said units to the cutter blades 73 which sever said stalks under reciprocation of the cutter bar 72 by the drive described in the foregoing. In this connection, the height at which the cutter blades 73 sever may be predetermined by adjusting the frame 24 into different set positions through the medium of the hand lever 26, detent 30 and upright 32, in a manner already described, which adjustment of said frame, as will be clear, adjusts the cutter bar 72 and other parts on the front of the frame 24 to different levels. As the stalks are severed, they are fed, or carried, by the sprocket chains 58, 59 and fingers 60, butt ends lowermost, up the butter boards 77 and thrown thereby onto the conveyor 33, which conveys the stalks, butt ends foremost, to the feed roller 44, the stalks being straightened out on said conveyor by engagement with the guide rods 71 in the manner already described. The conveyor 33 and feed roller 44 grip the stalks therebetween and force the same substantially endwise into the casing 39 to the combined cutter and blower 42, which functions to simultaneously cut the stalks into short length ensilage and blow the same up the discharge pipe into the bin 77'. The bin 77' may be emptied, or partially so, as desired, into a truck or wagon driven alongside the bin, and by merely lifting the latch arms 88, whereupon the ensilage will, under the influence of gravity, swing the gate 85 outwardly to open position and slide down the bottom 83 out of said bin. The discharge end 41 of the discharge pipe 40 is preferably swiveled on the pipe 40 as indicated at 91, whereby said end may be swung around clear of the bin 77' for direct discharge into the truck, or wagon, or a receptacle, as desired.

The foregoing will, it is believed, suffice to impart a clear understanding of my invention without further explanation.

Manifestly, the invention, as described, is susceptible of modifications without departing from the inventive concept and right is herein reserved to such modifications as fall within the scope of the subjoined claims.

What I claim is:

1. An ensilage harvesting machine comprising a motor driven vehicle including a front axle and wheels at the ends of said axle, a frame pivotally supported intermediate its ends on the axle, said frame including a front portion extending beyond the wheels and a rear portion, manually operated means for tilting the frame to raise and lower the front end thereof, a transversely arranged conveyor mechanism supported at the front of said frame and extending beyond the wheels, a blower casing supported on the frame at one end of the conveyor mechanism and having an opening for receiving material from said conveyor mechanism, a toothed drum rotatably supported on the frame slightly above the conveyor mechanism and located adjacent the casing for forcing material from the conveyor mechanism into the casing, laterally spaced stalk gatherers at the front end of the frame and including opposed sets of upper and lower conveyor chains for transporting stalks in upright position rearwardly, cutter means associated with said gatherers for cutting the stalks, guiding means for guiding the cut stalks upwardly upon the conveyor mechanism, guide bars for guiding the stalks from the gatherers upon the conveyor mechanism and causing the stalks to fall lengthwise upon the conveyor mechanism with the butt ends foremost to cause said butt ends to enter the blower casing first, a combined cutting and blower element in said casing, an upwardly extending discharge pipe connected with the casing.

2. In a machine for harvesting corn stalks and converting the same into ensilage, a motor driven vehicle including a front axle having wheels at its ends and a rearwardly extending part having a steering wheel at its rear end, a frame having intermediate parts pivotally suspended from the axle and including forwardly extending side bars extending beyond the wheels of the front axle and said side bars having parts converging rearwardly, a manually operated lever connected with the rear part of the vehicle and connected with the rear portion of the frame for tilting the frame on the axle to raise and lower the front part of said frame, gathering means at the front end of the frame, cutting means associated with the gathering means, a transversely arranged conveyor mechanism at the front end of the frame for receiving the material from the gathering means, a blower casing supported by the frame at one end of the conveyor means for receiving material therefrom, combined cutter and blower means in the casing, a discharge pipe leading upwardly from the casing.

LEONHART FREDRICK SOMMERFELD.